3,030,381
PRODUCTION OF 2,3 - DICYAN - 1,4 - DITHIA-ANTHRAHYDROQUINONE AND -ANTHRA-QUINONE
Ernst Jacobi, Darmstadt, Albert van Schoor, Traisa, near Darmstadt, and Heinrich Hahn, Darmstadt-Arheilgen, Germany, assignors to E. Merck Aktiengesellschaft, Darmstadt, Germany
No Drawing. Filed Oct. 13, 1960, Ser. No. 62,324
Claims priority, application Germany Oct. 17, 1959
8 Claims. (Cl. 260—327)

The present invention relates to an improved process for the production of 2,3-dicyan-1,4-dithia-anthrahydroquinone and -anthraquinone.

These compounds are described in our copending application Ser. No. 769,067, now U.S. Patent No 2,976,296. According to the method disclosed in this application, the disodium salt of 1,2-dicyan-1,2-dimercapto-ethene is condensed with 2,3-dichloro-naphthoquinone-(1,4). This method of preparation is disadvantageous in that naphthoquinone-(1,4) must first be converted into the 2,3-dichloro-naphthoquinone. This renders the process costly and there is an interest in finding a cheaper method of production as the 2,3-dicyan-1,4-dithia-anthrahydroquinone and -anthraquinone possess excellent fungicidal properties.

According to the invention it was found that 2,3-dicyan-1,4-dithia-anthrahydroquinone and -anthraquinone can be prepared in good yields by reacting a dialkali metal salt of 1,2-dicyan-1,2-dimercapto-ethene with naphthoquinone-(1,4) in the presence of an acid and of a dehydrogenating agent. The thus prepared 2,3-dicyan-1,4-dithia-anthrahydroquinone can then, if desired, be dehydrogenated by usual methods to the corresponding anthraquinone.

The reaction proceeds according to the following reaction scheme:

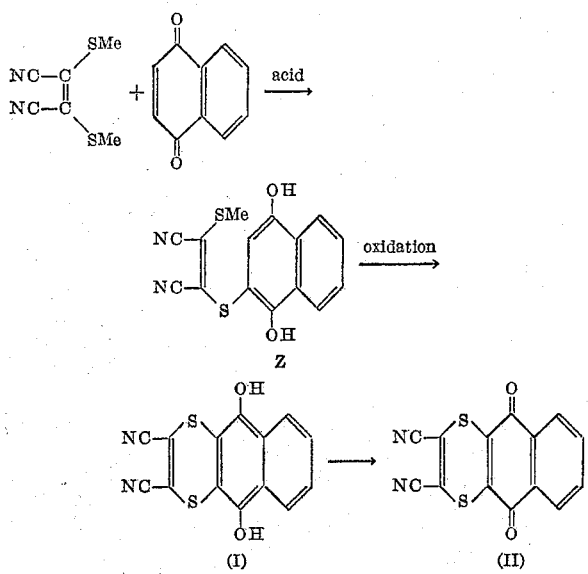

It was found particularly advantageous to employ the disodium salt of 1,2-dicyan-1,2-dimercapto-ethene and to carry out the condensation of this compound with naphthoquinone-(1,4) in the presence of methylene chloride and an acid, preferably glacial acetic acid. When naphthoquinone-(1,4) is employed in excess it acts simultaneously as a dehydrogenating agent for the obtained intermediate product Z and the 2,3-dicyan-1,4-dithia-anthrahydroquinone (I) is obtained in yields of over 90% based upon the quantity of 1,2-dicyan-1,2-dimercapto-ethene.

This high yield is most surprising as it was not apparent to a person skilled in the art that a double 1,4 addition in naphthoquinone-(1,4) would lead to ring closure in such a good yield.

According to another advantageous method of the invention, an aqueous solution of the disodium salt of 1,2-dicyan-1,2-dimercapto-ethene is reacted with naphthoquinone-(1,4) in the presence of an acid and of chloroform. The not isolated intermediate product Z obtained thereby is then converted into 2,3-dicyan-1,4-dithia-anthrahydroquinone (I) by a treatment with hydrogen peroxide or, when using an excess of hydrogen peroxide into the corresponding anthraquinone derivative (II).

It is not necessary that the dialkali metal salt of 1,2-dicyan-1,2-dimercapto-ethene be used in pure solid form. Solutions thereof such as are obtained in its production from an alkali metal cyanide and carbon disulfide can also be used. Usually dimethyl formamide or, according to a newer special method, dimethyl sulfoxide is used as the solvent in the preparation of this starting material. For the process of this invention, the alkali salt of 1,2-dicyan-1,2-dimercapto-ethene is preferably used in an aqueous solution. In most cases the disodium salt is employed.

The addition of the dialkali metal salt of 1,2-dicyan-1,2-dimercapto-ethene on naphthoquinone-(1,4) is carried out in the presence of an acid. Preferably such acids are used for the process of the present invention which may be used on a technical scale such as hydrogen chloride, sulfuric acid, nitric acid, phosphoric acid, acetic, formic or propionic acid or as well mixtures of these acids. In general, an organic solvent, such as chloroform, methylene chloride, 1,2-dichloroethane or carbon tetrachloride is added in this reaction. When reacting the dialkali metal salt of 1,2-dicyan-1,2-dimercapto-ethene with naphthoquinone-(1,4) an intermediate product (Z) is formed which is used for the further reaction without isolation. By treatment with a dehydrogenating agent this compound Z is converted into 2,3-dicyan-1,4-dithia-anthrahydroquinone. Suitable dehydrogenating agents are, for example, air, oxygen, hydrogen peroxide, nitric acid or an excess of the naphthoquinone-(1,4) used.

The 2,3-dicyan-1,4-dithia-anthrahydroquinone (I) may be oxidized with all oxidizing agents commonly used for such dehydrogenations to form the corresponding anthraquinone (II). Thus, for example, ferric chloride or potassium bichromate in dilute sulfuric acid may be used as oxidizing agents. Other suitable agents for this reaction are for instance hydrogen peroxide, nitric acid, air and oxygen.

The anthraquinone derivative (II) can also be produced from the dialkali metal salt of 1,2-dicyan-1,2-dimercapto-ethene in a "single vessel" process without isolation of the anthrahydroquinone derivative (I).

Thus, in a quite simple manner good yields are obtained when the intermediate product Z obtained from the condensation of the naphthoquinone-(1,4) with the dialkali metal salt of 1,2-dicyan-1,2-dimercapto-ethene is oxidized with an excess of hydrogen peroxide. In this case, the 2,3-dicyan-1,4-dithia-anthraquinone (II) is obtained directly. When using only 1 mole of hydrogen peroxide in this process, the 2,3-dicyan-1,4-dithia-anthrahydroquinone (I) is formed in good yields.

The reaction products (I) and (II) precipitate in the reaction mixture. They are filtered off, washed with water and dried.

The condensation of the naphthoquinone with the dialkali metal salt of 1,2-dicyan-1,2-dimercapto-ethene is preferably carried out at temperatures below 50° C. The oxidation of the 2,3-dicyan-1,4-dithia-anthrahydroquinone (I) to the corresponding anthraquinone derivative (II), however, may be effectuated as well at somewhat higher temperatures, for example, up to about 150° C.

The process according to the invention therefore provides a simple synthesis suitable for large scale technical operations for the production of two compounds which because of their excellent fungicidal properties are to be used as fungicides in agriculture. The use of these compounds as fungicides is already the subject matter of the German Patent 1,060,655.

The following examples will serve to illustrate several embodiments of the invention.

*Example 1*

16 g. of naphthoquinone-(1,4) were suspended in 50 cc. of methylene chloride and 6 g. of glacial acetic acid added thereto. A solution of 9.3 g. of the disodium salt of 1,2-dicyan-1,2-dimercapto-ethene in 50 cc. of water was added to the resulting solution at 20° C. over a period of 1 hour. The reaction solution was then stirred for ½ an hour and the resulting precipitate filtered off on a suction filter and washed with water. The filtration residue was then washed with methylene chloride to remove the 1,4-naphthohydroquinone formed as a by-product. A 91% yield of 2,3-dicyan-1,4-dithia-anthrahydroquinone (I) was obtained which could be recrystallized from ethyl acetate.

Its melting point was 212–215° C. The compound produced caused no melting point depression when mixed with the compound produced by the hydrogenation of the corresponding anthraquinone compound (II). The infra-red spectrum of both substances was identical.

*Example 2*

(a) 1 g. of the anthrahydroquinone compound I produced in Example 1 was dissolved in 35 cc. of dimethyl formamide and a solution of 2.0 g. $FeCl_3.6H_2O$ in 5 cc. of dimethyl formamide added thereto over a period of five minutes at 20° C. Thereafter the reaction mixture was stirred for ½ an hour at 50° C. and then poured into water. The precipitate was filtered off and washed with water. After drying, 0.85 g. of 2,3-dicyan-1,4-dithia-anthraquinone (II) of a melting point of 218° C. was obtained. When mixed with the anthraquinone compound of German Patent 1,060,655, no melting point depression occurred and the infra-red spectrum of both substances were identical.

(b) 1 g. of the anthraquinone compound (I) produced in Example 1 was dissolved in 60 cc. of hot methanol and a solution of 0.35 g. of potassium bichromate in 3 cc. of 2 n sulfuric acid added thereto over a period of 5 minutes at 0° C. The reaction mixture was then stirred for an hour at 0° C. The resulting precipitate of compound (II) was filtered off and washed with water. .82 g. thereof with a melting point of 217–219° C. were obtained. The infra-red spectrum was identical with the infra-red spectrum of the compound produced in Example 2a.

*Example 3*

5 g. of sodium cyanide were added to 25 g. of dimethyl sulfoxide. Then 8 g. of carbon disulfide were added to the resulting reaction mixture at 30° C. over a period of ½ an hour. The mixture was then stirred for 1½ hours at 40° C. Thereafter 50 cc. of water were added to the resulting reaction solution and the solution heated for 1 hour at 50° C. The sulfur which had precipitated was filtered off and washed with a litle water. The filtrate was then dropped into a solution of 16 g. of naphthoquinone-(1,4) and 6 g. of glacial acetic acid in 75 cc. of methylene chloride over a 30 minute period, the reaction soluiton being maintained at 20° C. by light cooling. The solution was stirred for a further 30 minutes and then 60 g. of $FeCl_3.6H_2O$ in 60 cc. of water added thereto. After stirring the reaction mixture for an hour at room temperature the solids were filtered off on a suction filter and then washed thoroughly with water and with methanol. 13.5 g. of 2,3-dicyan-1,4-dithia-anthraquinone remained on the filter corresponding to a yield of 91% of the theoretical. The melting point of the product was 218–220° C. About half of the anthraquinone-(1,4) supplied could be recovered from the filtrate.

*Example 4*

A solution prepared from 15.2 g. of carbon disulfide and 10 g. of sodium cyanide in 50 cc. of dimethyl sulfoxide with subsequent sulfur separation by addition of water was slowly dropped into a mixture of 15.8 g. of naphthoquinone-(1,4), 25 cc. of water and 75 cc. of benzene over a period of 8 hours at 20–25° C. Diluted acetic acid was dropped in simultaneously to maintain a pH of 5.5–6. At the same time air (or oxygen) was introduced into the gas space in the vessel above the reaction mixture over a gas meter. The reaction was practically completed after a further hour's stirring when the oxygen taken up amounted to about 1.15 liters.

The solid reaction product was filtered off on a suction filter, washed with benzene and water and dried at a temperature not exceeding 40° C. The yield amounted to over 85% of 2,3-dicyan-1,4-dithia-anthrahydroquinone of a melting point of 208° C. which after a single recrystallization from dioxane/chloroform melted at 210–215° C. The product could be converted almost quantitatively into 2,3-dicyan-1,4-dithia-anthraquinone by oxidation with $FeCl_3$ or potassium bichromate as described in Examples 2a and 2b.

*Example 5*

10 g. of sodium cyanide in 50 g. of dimethyl sulfoxide were reacted with 160 g. of carbon disulfide in the usual manner and 150 cc. of water added to cause separation of sulfur. The resulting aqueous solution of the disodium salt of 1,2-dicyan-1,2-dimercapto-ethene was placed in a separatory funnel. The air therein was displaced with nitrogen and a solution of 16 g. of naphthoquinone-(1,4) in 75 cc. of dichloroethane which had been acidified with 11 cc. of glacial acetic acid added all at once. Thereafter, the mixture was shaken thoroughly for 1 minute. Thereafter the lower layer was drawn off from the separatory funnel and the cold aqueous solution placed in an upright cylinder and air blown therethrough while maintaining a weakly acidic reaction. 2,3-dicyan-1,4-dithia-anthrahydroquinone was produced as a brown granular precipitate. The precipitate was filtered off on a suction filter and washed with water and then oxidized in aqueous suspension with 60 g. of $FeCl_3.6H_2O$ at room temperature. After completion of the reaction, the resulting precipitate was filtered off on a suction filter and washed well first with water and then with methanol and dried at a temperature not exceeding 45° C. The resulting light sand gray powder consisted of technically pure 2,3-dicyan-1,4-dithia-anthraquinone of a decomposition point of about 220° C.

*Example 6*

The disodium salt of 1,2-dicyano-1,2-dimercapto ethene was prepared in the usual way from 30.6 g. of sodium cyanide and 50 g. of carbon disulfide dissolved in 225 g. of dimethyl formamide containing 7% of water. The aqueous solution of the obtained disodium salt was washed with chloroform to separate the dimethyl formamide and was subsequently cooled to 0–5° C. This cooled aqueous solution of the disodium salt of 1,2-dicyano-1,2-dimercapto ethene was shaken for a short time with a solution of 47 g. of naphthoquinone-(1,4) and 54 g. of glacial acetic acid in 420 cc. of chloroform at a temperature below 5° C. The chloroform layer was separated. The aqueous layer was stirred with 60.8 g. of hydrogen peroxide (35%) thereby maintaining the temperature by cooling at about 20° C. The reaction was continued until a sample no longer showed a blue color with aqueous sodium hydroxide (about 2 to 3 hours). The precipitated 2,3-dicyano-1,4-dithia-anthraquinone was filtered off and washed with water. 76.5 g. of a light brown product with a decomposition point of 218–220° C. were obtained. Yield 95%.

*Example 7*

30 g. of 2,3-dicyano-1,4-dithia-anthrahydroquinone were suspended in 150 cc. of water and 37.5 cc. of nitric acid (50%) were added. The reaction mixture was stirred for 5 to 6 hours at a temperature of about 40° C. The precipitated 2,3-dicyano-1,4-dithia-anthraquinone was filtered off, washed with water and dried.

*Example 8*

5 g. of sodium cyanide were reacted in the usual manner with 8 g. of carbon disulfide in dimethyl formamide. To the solution of the disodium salt of 1,2-dicyano-1,2-dimercapto ethene thus obtained there were added 7.9 g. of naphthoquinone in 40 cc. of methylene chloride and 8.35 cc. of hydrogen chloride (6 n) at a temperature of about 0 to 3° C. After stirring for one minute a solution of 6.25 g. of hydrogen peroxide (30%) in 25 ml. of HCl (2 n) was added and the reaction mixture was stirred for another ½ an hour.

To complete the oxidation, 0.1 g. of ferric chloride and 6.25 g. of hydrogen peroxide were added. After stirring for two hours, the separated 2,3-dicyano-1,4-dithia-anthraquinone was filtered off, washed with water and dried.

When using equivalent amounts of nitric acid instead of hydrogen chloride, the same yields were obtained.

*Example 9*

75 g. of 2,3-dicyano-1,4-dithia-anthrahydroquinone are suspended in 300 cc. of water. After addition of 0.75 g. of $CoCl_2.6H_2O$ and 0.75 g. of $CuSO_4$ the reaction mixture is shaken with oxygen under pressure (1 atm.) for 16 hours at room temperature. Then the resulting 2,3-dicyano-1,4-dithia-anthraquinone is filtered off, washed with water and dried.

We claim:
1. A process for the manufacture of a member selected from the group consisting of 2,3-dicyan-1,4-dithia-anthrahydroquinone and -anthraquinone, comprising the steps of reacting a dialkali metal salt of 1,2-dicyan-1,2-dimercapto-ethene with naphthoquinone-(1,4) in contact with an acid selected from the group consisting of hydrogen chloride, sulfuric acid, nitric acid, phosphoric acid, acetic acid, formic acid and propionic acid and mixtures of such acids and in contact with a dehydrogenating agent selected from the group consisting of hydrogen peroxide, air, oxygen, nitric acid and naphthaquinone-(1,4) to form 2,3-dicyan-1,4-dithia-anthrahydroquinone and oxidizing the resulting 2,3-dicyan-1,4-dithia-anthrahydroquinone with an oxidizing agent selected from the group consisting of ferric chloride, potassium bichromate, hydrogen peroxide, nitric acid, air and oxygen to form 2,3-dicyan-1,4-dithia-anthraquinone.

2. A process for the manufacture of a member selected from the group consisting of 2,3-dicyan-1,4-dithia-anthrahydroquinone and -anthraquinone, comprising the steps of reacting a dialkali metal salt of 1,2-dicyan-1,2-dimercapto-ethene with naphthoquinone-(1,4) in contact with an acid selected from the group consisting of hydrogen chloride, sulfuric acid, nitric acid, phosphoric acid, acetic acid, formic acid and propionic acid and mixtures of such acids and in contact with a dehydrogenating agent selected from the group consisting of hydrogen peroxide, air, oxygen, nitric acid and naphthoquinone-(1,4) in the presence of an organic solvent selected from the group consisting of chloroform, methylene chloride, carbon tetrachloride, 1,2-dichloroethane and benzene to form 2,3-dicyan-1,4-dithia-anthrahydroquinone, and oxidizing the resulting 2,3-dicyan-1,4-dithia-anthrahydroquinone with an oxidizing agent selected from the group consisting of ferric chloride, potassium bichromate, hydrogen peroxide, nitric acid, air and oxygen to form 2,3-dicyan-1,4-dithia-anthraquinone.

3. A process for the manufacture of 2,3-dicyan-1,4-dithia-anthrahydroquinone which comprises reacting the disodium salt of 1,2-dicyan-1,2-dimercapto-ethene with an excess of naphthoquinone-(1,4) in contact with an acid selected from the group consisting of hydrogen chloride, sulfuric acid, nitric acid, phosphoric acid, acetic acid, formic acid and propionic acid and mixtures of such acids in the presence of an organic solvent selected from the group consisting of chloroform, methylene chloride, carbon tetrachloride, 1,2-dichloroethane and benzene.

4. A process for the manufacture of 2,3-dicyan-1,4-dithia-anthrahydroquinone which comprises reacting the disodium salt of 1,2-dicyan-1,2-dimercapto-ethene with one mole of hydrogen peroxide in the presence of methylene chloride and hydrogen chloride.

5. A process for the manufacture of 2,3-dicyan-1,4-dithia-anthraquinone which comprises oxidizing 2,3-dicyan-1,4-dithia-anthrahydroquinone with a member of the group consisting of ferric chloride, potassium bichromate, hydrogen peroxide, nitric acid, air and oxygen.

6. A process in accordance with claim 5 wherein the oxidation is carried out by oxygen in the presence of catalytic amounts of $CoCl_2$ and $CuSO_4$.

7. A process for the manufacture of 2,3-dicyan-1,4-dithia-anthraquinone which comprises reacting the disodium salt of 1,2-dicyan-1,2-dimercapto-ethene with naphthoquinone-(1,4) in contact with hydrogen peroxide and an organic solvent selected from the group consisting of chloroform, methylene chloride, carbon tetrachloride, 1,2-dichloroethane and benzene and a member of the group consisting of hydrogen chloride and acetic acid; and oxidizing the 2,3-dicyan-1,4-dithia-anthrahydroquinone thus obtained by treatment with a member of the group consisting of hydrogen peroxide and oxygen to form 2,3-dicyan-1,4-dithia-anthraquinone.

8. A process for the manufacture of 2,3-dicyan-1,4-dithia-anthraquinone which comprises reacting an aqueous solution of the disodium salt of 1,2-dicyan-1,2-dimercapto-ethene with naphthoquinone-(1,4) in contact with methylene chloride, acetic acid and a member of the group consisting of air and oxygen; and oxidizing the 2,3-dicyan-1,4-dithia-anthrahydroquinone thus obtained by treatment with ferric chloride to form 2,3-dicyan-1,4-dithia-anthraquinone.

No references cited.